United States Patent [19]

Dillow

[11] 3,780,714
[45] Dec. 25, 1973

[54] FUEL VAPORIZER FOR INTERNAL COMBUSTION ENGINES

[76] Inventor: Dorris Leon Dillow, 541 E. Haven Dr., Centralia, Ill.

[22] Filed: Aug. 2, 1971

[21] Appl. No.: 168,076

[52] U.S. Cl. ............. 123/122 AA, 165/51, 261/144
[51] Int. Cl. ............................................ F02m 31/10
[58] Field of Search............. 123/122 AA, 122 AB, 123/122 A, 122 B, 122 C, 122 D, 122 F, 122 R, 133, 141, 34, 35, 142.5; 431/207, 215; 261/144, 145, 155, 152; 165/51, 52, 163

[56] References Cited
UNITED STATES PATENTS

| | | | |
|---|---|---|---|
| 1,456,018 | 5/1923 | Wiegand | 123/122 F |
| 1,320,528 | 11/1919 | Burkes | 123/122 F |
| 3,042,016 | 7/1962 | Christian | 123/122 AA |
| 1,023,402 | 4/1912 | Whiting | 123/122 AA |

FOREIGN PATENTS OR APPLICATIONS

| | | | |
|---|---|---|---|
| 499,893 | 12/1919 | France | 261/145 |
| 177,552 | 3/1922 | Great Britain | 123/122 AA |
| 822,241 | 12/1937 | France | 123/122 AA |

Primary Examiner—Al Lawrence Smith
Attorney—Edward F. Connors

[57] ABSTRACT

A tubing is tightly coiled in a frusto-conical shape and is vertically installed within the intake manifold chamber of an internal combustion engine below and in common mounting arrangement with a conventional carburetor for preheating and vaporizing the liquid fuel emitted from the throat of the carburetor. The coiled tubing has opposing open ends that are connected to the water cooling system of the engine and function as inlet and outlet ends for the thermostatically controlled passage of hot water through the coils of the tubing so that when the liquid fuel, passing through the vertical path defined by the turns of the tubing, comes in contact with the tubing it is instantaneously changed within the manifold chamber into a vapor.

1 Claim, 3 Drawing Figures

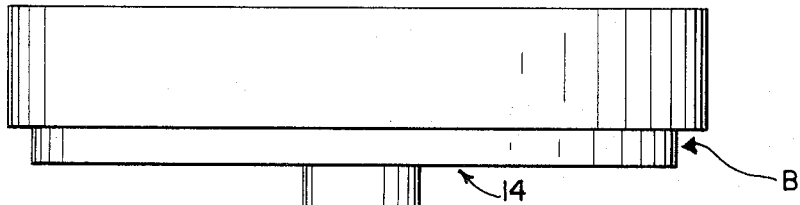
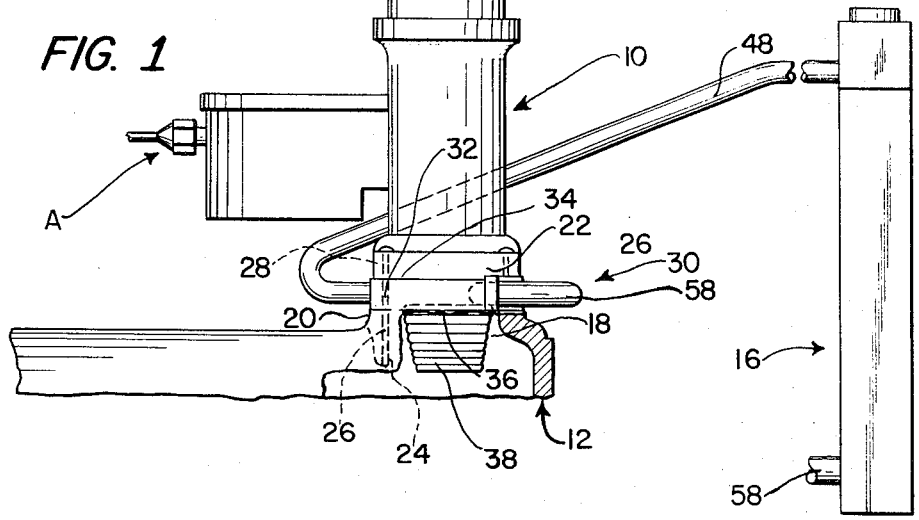
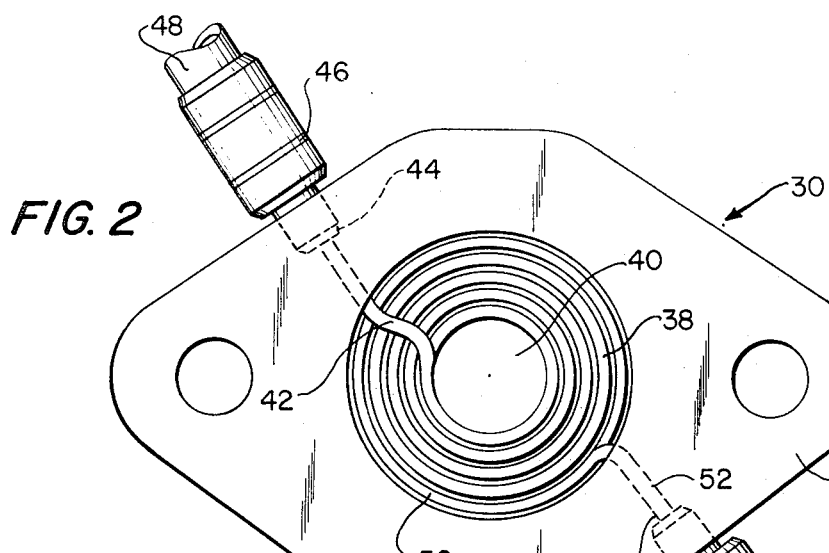
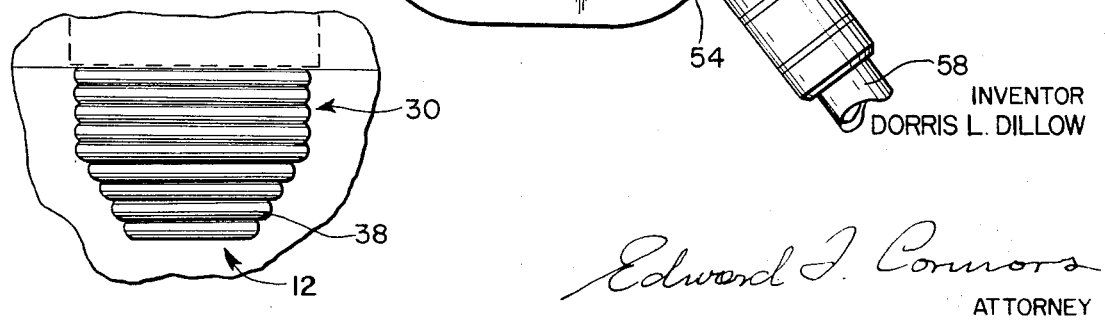

FUEL VAPORIZER FOR INTERNAL COMBUSTION ENGINES

BACKGROUND OF THE INVENTION

1. Field Of The Invention:

The present invention generally appertains to improvements in the operation of internal combustion engines and more particularly is directed to a new and novel means for vaporizing the fuel mixture within the intake mainfold of such an engine.

2. State Of The Prior Art:

In internal combustion engines, the liquid fuel, usually gasoline, is fed by a fuel pump from the fuel tank to a carburetor wherein it is admixed with air in proper proportions. The resultant atomized gasoline and air mixture is then sprayed into the intake manifold chamber from whence it is sucked into the engine cylinders and therein ignited. While such mixture should vaporize so as to be easily ignited the difficulty often arises that complete vaporization does not take place with a resultant incomplete combustion of the fuel mixture and attendant power loss, decreased gasoline milage and increased exhaust pollution along with increased harmful engine deposits.

Many attempts have been made to provide operational devices for preheating and vaporizing the atomized gasoline and air mixture so as to achieve complete and clean combustion of the mixture within the cylinders. Most attempts have involved the provision of preheaters for the gasoline mixture with such preheaters being mounted in the fuel tank or in the fuel line and, in some instances, near the carburetor. In one attempt, an electrically heated coil is mounted in the flow path of the gasoline mixture but such attempt is fraught with danger as it could cause the gasoline mixture to explode within the manifold chamber. Other attempts not only have this fault but also tend to produce vapor locks in the fuel system. Also, prior attempts to achieve complete vaporization of the fuel mixture have not been commercially accepted because they are not reliable and safe and are expensive in their construction and in their installation in a conventional engine. Thus, a vaporizer to be accepted must not only be safe and effect complete vaporization of the fuel mixture but it also must be rather inexpensive in its initial cost and in the cost of installation which must be effected in a practical manner without necessitating extensive modification of the engine.

SUMMARY OF THE INVENTION

The primary object of the present invention is to provide an extremely simple and compact vaporizer which is relatively inexpensive in cost and in installation and which can be easily installed without modification of the engine and which, in operation, is safe and operative to effect complete vaporization of the fuel mixture within the manifold chamber.

The vaporizer of the present invention is in the form of a coiled tubing which is installed within the intake manifold chamber immediately below and commonly with the conventional carburetor. The vaporizer has a body block or portion that is provided with vertical bores adapted to receive the conventional stud bolts that mount the mounting flange of a carburetor on the carburetor seat provided on the manifold housing. The body block is adapted to seat on the manifold under the carburetor flange and to be held in place by the stud bolts.

The coiled tubing is vertically positioned below the carburetor within the manifold chamber and the turns of the tubing are tight together and assume an inverted frusto-conical shape which is open at its upper major end and at its lower minor end. Such conically configured tubing provides a pathway for the fuel mixture from the carburetor. The tubing has opposing open ends that lie in the same plane within the body block and to which fittings are connected for hose or tubing connections from the engine water system. By virtue of the connections from the water system of the engine, there is a constant circulation of thermostatically controlled hot water through the entire tubing. Thus, the turns of the tubing are constantly carrying hot water and, therefor, the turns are constantly heated. The turns provide a flow path for the fuel mixture in its passage from the carburetor to the intake manifold chamber and the fuel mixture impinges on the heated turns of the tubing and is instantaneously vaporized.

Since the vaporizer seats on the carburetor seat provided on the mainfold and is secured in place commonly with the carburetor mounting flange by the conventional stud bolts, no modification of the engine is required to mount the vaporizer in position for effective use. And the hot water connections for the vaporizer can be easily fitted into the water system, as at the water pump and the radiator or elsewhere at the water jacket.

The vaporizer is disposed so that vaporization takes place within the manifold chamber thereby eliminating any possibility of a vapor lock in the fuel system or any possibility of an explosion of the fuel mixture before it reaches the engine cylinders.

BRIEF DESCRIPTION OF THE DRAWING

FIG. 1 is a fragmentary side elevational view of a conventional internal combustion engine with only the carburetor and intake manifold assembly and part of the water system being shown, and with the manifold being broken away and shown in vertical section so as to expose the vaporizer of the present invention which is shown in side elevation in its position within the intake manifold and connected to the water system, such connection being only diagrammatically illustrated.

FIG. 2 is a top plan view of the vaporizer of the present invention.

FIG. 3 is an enlarged side elevational view of the coiled tubing of the vaporizer.

DESCRIPTION OF THE PREFERRED EMBODIMENT

Referring now more particularly to the accompanying drawing and initially to FIG. 1 thereof, the reference numeral 10 generally designates an internal combustion engine of which only the intake manifold 12 and the carburetor 14 are shown in detail. The engine has a water circulating system including a radiator, water jacket and a water circulating pump 16.

The upper wall of the manifold is formed with the usual opening 18 communicating the chamber of the manifold that is in communication with the engine cylinders with the carburetor that is mounted on the manifold. Such opening 18 is surrounded by a raised and thickened seat 20 on which the base mounting flange 22 of the carburetor is adapted to seat with suitable gasket means sealingly interposed therebetween. The seat has vertically disposed threaded bores 24 to receive stud bolts 26 that pass through vertical openings 28 in the mounting flange 22 of the carburetor and secure the carburetor in place on the manifold seat.

The vaporizer 30 of the present invention includes a flat body block or portion 32 having a flat upper face 34 and a flat lower face 36 and being of a cross-sectional size and configuration complemental to the carburetor flange 22. The lower face rests on the manifold seat 20 while the upper face has the carburetor flange 22 superimposed thereon with suitable sealing gaskets provided, as needed. The bolts 26 secure the flange 22 and the body block 32 of the vaporizer onto the manifold seat.

The vaporizer 30 further includes a tubing 38 that is preferably formed from copper tubing of about ⅛ inch diameter, with the tubing being coiled within and depending from the center opening 40 in the body block 32. The body block is preferably about ⅝ inch thickness and supports the tubing 38 in its mounted position on the manifold seat 20. The tubing 38 has an inlet end portion 42 that extends from an inlet opening 44 in the body block and is arranged radial to the center opening 40. The inlet opening carries a fitting 46 which secures an inlet hose or tubing 48 in fluid tight communication with the inlet end portion 42 of the tubing. The inlet end portion 42 projects radially into the center opening 40 of the body block and then is turned downwardly and coiled about itself in tightly contacting turns or convolutions and terminating in an uppermost turn 50 that has a radial outlet end portion 52. The outlet end portion 52 is secured in an outlet opening 54 formed in the body block and arranged across from and coplanar with the inlet opening 44. The outlet opening 54 carries a fitting 56 which receives an outlet tube or hose 58 in fluid tight communication with the outlet end portion 52 of the vaporizer tubing.

The inlet and outlet hoses or tubings 48 and 58 are connected to the water pump 16 in a way so that they constantly circulate thermostatically controlled hot water through the turns of the vaporizer tubing. Of course, any other feasible connection can be made for the hoses to the end that they are part of the hot water circulating system of the engine and supply hot water to the turns of the vaporizer tubing in a constantly circulating fashion.

The turns of the vaporizer tubing are tight together with the uppermost turns being of about the same diameter and the lower turns being of gradually decreasing diameters so that the tubing defines an inverted frusto-conical funnel which provides a downwardly tapering pathway for the fuel mixture emitted from the carburetor. The lowermost turn is spaced above the bottom wall of the manifold chamber, as shown in FIG. 1. As the fuel mixture emitted from the carburetor, and consisting of gasoline from the fuel line A and air brought into the carburetor through the air filter B, is sprayed from the carburetor into the pathway of the tubing turns, it impinges on the heated tubing and is instantaneously vaporized.

The spacing of the lowermost turn above the bottom of the manifold chamber is of importance to insure good flow conditions of the vapor while the tapered pathway causes more effective and instantaneous vaporization of the fuel mixture.

It is believed that the operation and installation of the vaporizer will be clear from the foregoing taken in conjunction with the accompanying drawing but it is to be understood that the foregoing description, including the " Abstract ", and the accompanying drawing are merely exemplary in nature and that the appended claims define the true scope and spirit of the invention.

What is claimed is:

1. For use with an internal combustion engine having an intake manifold supplied with a fuel mixture of gasoline and air by a connected and communicating carburetor and having a circulating hot water system, with said carburetor having a mounting flange and said manifold having an exterior seat normally adapted to receive said flange, a device for vaporizing the fuel mixture as it is emitted from the carburetor into the manifold comprising a tubing coiled upon itself in a number of tightly contiguous turns having a common unobstructed center with such center defining an unobstructed pathway for the fuel mixture emitted from the carburetor, said turns assuming a frusto-conical configuration so that the tubing has a tapered shape and is provided with an open major end and an open minor end, said open major end being disposed at the carburetor and the open minor end being disposed within the manifold and spaced from the inner wall thereof, said tubing having substantially coplanar inlet and outlet end portions radially projecting from the tubing at the major end thereof, a body block provided with a center opening of a size and shape approximating that of the intake manifold and having radial bores communicating the exterior of the block with the center opening, one of said tubing end portions projecting radially from the radial bore towards but spaced from the center of the opening in the body block and being curvedly inclined downwardly towards the minor end and being coiled upon itself to define the open minor end with said turns of the tubing increasing in diameter upwardly to the major end from which the other end portion radially extends at the perimeter of the block opening into its associated radial bore in the block, said bores having fitting means for connection with hoses that are in communication with a hot water system for the constant flow of the hot water through the turns of the tubing so that each turn thereof is heated to the same degree whereby the fuel mixture flowing in the unobstructed center pathway in the tubing impinges on the heated turns and is instantaneously vaporized as it enters the manifold, said body block being fixedly interposed between the carburetor flange and the manifold seat and means that is normally adapted for fastening the carburetor flange onto the manifold seat passing through said block for anchoring it in its interposed position between the carburetor flange and the manifold seat with the tubing being wholly housed within the manifold in dependency from the body block to effect an even distribution of the vaporized fuel to all of the cylinders of the engine.

* * * * *